United States Patent [19]

Croft

[11] Patent Number: 5,010,618

[45] Date of Patent: Apr. 30, 1991

[54] CORNER FINISHING TOOL

[76] Inventor: Eugene B. Croft, P.O. Box 663, Thayne, Wyo. 83127

[21] Appl. No.: 538,424

[22] Filed: Jun. 15, 1990

[51] Int. Cl.⁵ ........................ B05C 17/10; B29C 23/00

[52] U.S. Cl. ........................ 15/235.7; 425/87; 425/458

[58] Field of Search ........................ 15/235.7, 235.8; 425/87, 458

[56] References Cited

U.S. PATENT DOCUMENTS 2,594,606 4/1952 Ames ........................ 425/87
2,824,443 2/1958 Ames ........................ 425/87
3,932,101 1/1976 Johnson et al. ........................ 425/458
4,116,604 9/1978 Johnson et al. ........................ 15/235.7 X
4,451,223 5/1984 Mower et al. ........................ 425/458
4,767,297 8/1988 Mower et al. ........................ 15/235.7 X

FOREIGN PATENT DOCUMENTS 800837 9/1958 United Kingdom ........................ 15/235.7

*Primary Examiner*—Chris K. Moore
*Attorney, Agent, or Firm*—M. Reid Russell

[57] ABSTRACT

A corner finishing tool for use in drywall finishing that consists of wings spreading from a center ridge that is configured to cut through drywall compound ("mud") on a wall corner, the wings including mud dams formed on their wall engaging faces to smooth tops from the mud and to spread a mud impregnated tape in from that wall joint and to direct excess mud into a space formed by that ridge, the dams and a flange projecting rearwardly from the peripheral edges of the wings.

5 Claims, 1 Drawing Sheet

CORNER FINISHING TOOL

BACKGROUND OF THE INVENTION

1. Field of the Invention

This invention relates to dry wall finishing tools and particularly to tools adapted to be used to make a smooth finished corner junction between intersecting sheetrock or drywall panels.

2. Prior Art

In the installation of drywall or sheetrock panels, the panels are normally nailed or glued in side-by-side relationship to make a flat wall and are placed in end-to-end engagement at right angles to join at corners of a room. The edges of the panels are normally somewhat beveled and tape and a drywall compound, generally referred to as "mud" are used to fill the crevasse formed by the end-to-end engagement of the panels.

The tapes used are usually made of paper or a fiberglass mesh and one side is coated with mud before the tape is applied to the corner junction with the mud beneath the tape.

The most common method of smoothing the tape and smoothing the mud into a corner junction is believed to be with use of wide blade putty knives. However, some V-shaped tools have been proposed and used in the past. The tools with which I am familiar are all made of metal and have V-shaped wings with flat surfaces. In using such tools it is generally necessary to have the tape, with mud applied thereto, rolled with a special roller to press the mud deep into the corner and to spread the mud. A smaller head is most effective in creating a proper corner but often will leave ridges at the outer edges of the tape where the mud is pressed out by the tool. If a larger tool is used it often rides into the corner, engages the tapered edges and extends upwardly and outwardly away from the wall so that mud collected therebeneath will harden into a ridge.

It has also been found that as these known tools slide along a corner tape they cause the mud to plow ahead of the tools. This raises and buckles the tape. As a tool passes, it wipes the tape smooth again but a great deal of work is required to move the tool. The drag developed is also partially the result of the metal, usually stainless steel, from which the tool is constructed.

OBJECTS OF THE INVENTION

Principal objects of the present invention are to provide a long lasting, relatively inexpensive corner finishing tool for use in dry wall installations that is easy to use and that will provide a smooth finished joint.

Other objects are to provide a tool that will cut through mud collecting ahead of the tool as it travels, and that will, at the same time, somewhat pull the tape in the direction of tool travel and outwardly from the center thereof, to tighten and smooth the tape.

Another object is to provide a tool that will direct excess mud outwardly from the joint and that will sharply engage the wall board beyond the beveled edge thereof to prevent mud oozing past the outer edges of the tool drying as ridges.

Still another object is to provide a tool that will slice sharply through mud in the joint so that the tool can maintain wall engagement to prevent passage of mud past the outer tool edges where it will form ridges.

Another principal object is to provide a corner finishing tool that can be used to provide a smooth corner joint that, after drying, requires little, if any, final sanding and finish work before painting.

FEATURES OF THE INVENTION

Principal features of the invention include a tough nylon or plastic smoothing head with wings forming essentially a ninety-two (92) degree angle and having a ball socket formed in the junction of the wings on a back side of the head. The wings for engaging and traveling along a sheetrock corner, smoothing "mud" along that joint.

A central ridge member projects from the junction of the wings at the face of the head and a flange extends from the outermost edge of each wing to engage the ridge member at a rear end of the head.

Each wing extends further from the ridge member at a forward edge of the head than at the rear end directing mud to flow inwardly. Each wing has a dam member that extends from the ridge to the flange of the wing on the face of the head. Each dam member extends, at an angle from the ridge member, from just slightly behind the forward end of the head, rearwardly into engagement with the flange for directing "mud" outwardly towards the wing flange member as it is moved along a joint. At the connection of the dam to the ridge, the dam projects from the wing so as to be essentially flush with the outermost edge of the ridge member. The dam projects uniformly from the face of the wing and the outermost edge of the dam engages the flange intermediate an inner wall of the flange.

The outermost edge of the wing flange is made sufficiently wide to provide a gliding surface and innermost edges thereof are made sufficiently sharp to prevent mud passage there past.

Other objects and features of the invention will become apparent from the following detailed description and drawings disclosing what are presently contemplated as being the best modes of the invention.

THE DRAWINGS

DETAILED DESCRIPTION OF THE INVENTION

Figure 1:
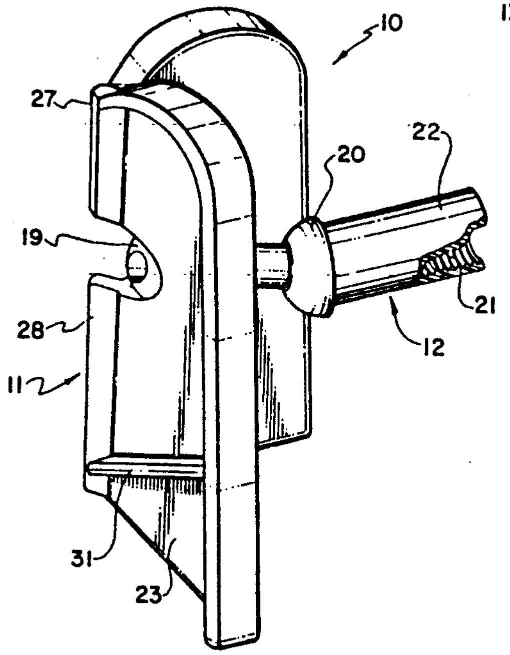
FIG. 1 is a perspective view of the corner finishing tool of the invention taken from the rear end and slightly below the head.

Referring now to the drawings:

In the illustrated preferred embodiment, the corner finishing tool of the invention, shown generally at 10, includes a head 11 and a handle attachment 12.

Figure 2:
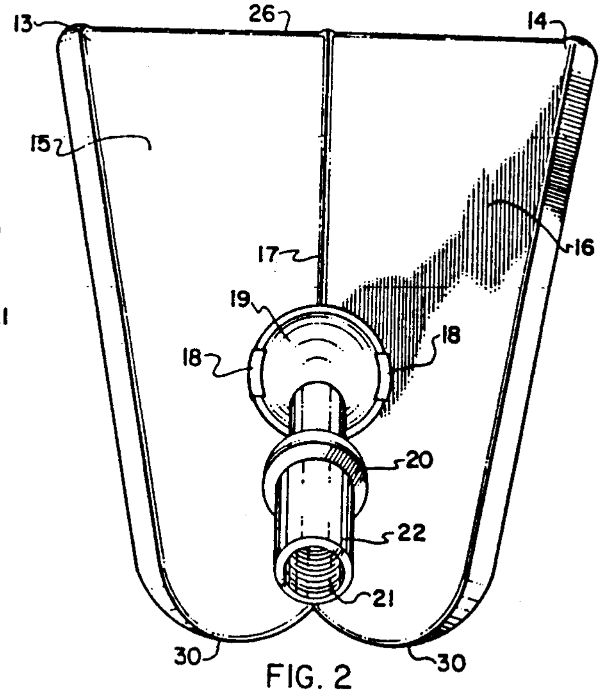
FIG. 2, is a top plan view.

Shown best in FIG. 2, the head 11 includes a pair of wings 13 and 14 each having respective back surfaces 15 and 16 that are joined at an angle of from 92°–95° degrees, at a junction 17.

A ball socket 18 is formed in the junction 17 to receive a ball 19, of the handle attachment 12. The ball socket 18 and ball 19 have sufficient resiliency to allow the ball to be snapped into so as to be securely held within the ball socket. Shown in FIG. 1, a tubular extension 20 projects outwardly and angularly from the ball 19 and has threads 21 formed in the end 22 thereof remote from the ball to receive the threaded end of an extension handle, not shown.

Figure 3:
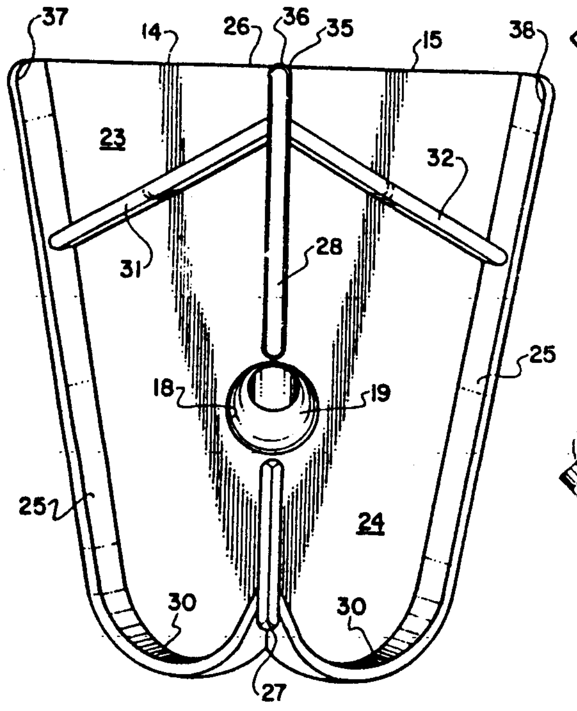
FIG. 3, is a bottom plan view.
Figure 4:
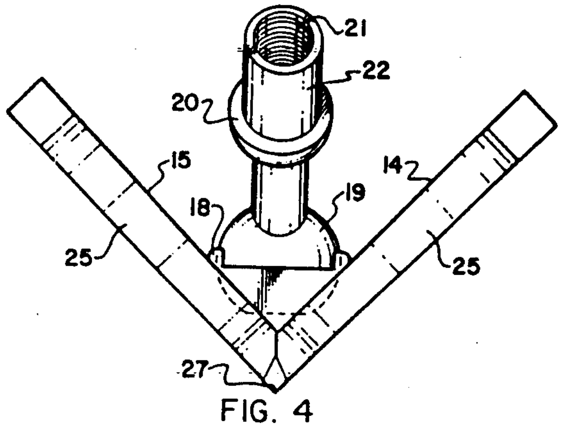
FIG. 4, is a rear elevation view.
Figure 5:
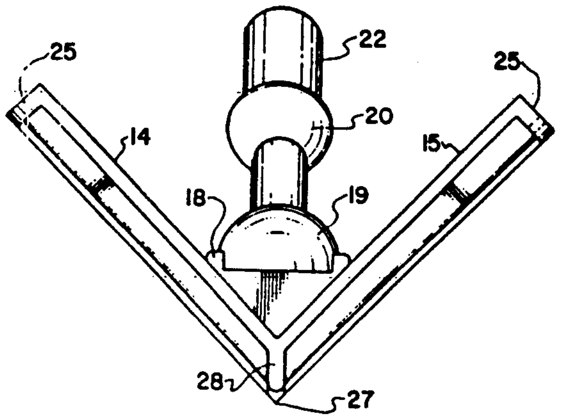
FIG. 5, is a front elevation view.

Shown in FIG. 3, the wings 13 and 14 also have respective face surfaces 23 and 24. Each face includes a flange 25 that projects from the outermost edge of each face surface, beginning at a leading edge 26 of the tool 12 and terminates at a common rear edge 27 of the tool in engagement with a ridge 28.

The ridge 28 projects from the common periphery of faces 23 and 24 of the wings 13 and 14 and, as will be further explained, provides a barrier to an escape of mud from beneath the wings 13 and 14 during use of the tool.

Each of the wings 13 and 14 extends outwardly from the ridge 28 a maximum distance at the leading edge 26 and the outermost edges thereof are gradually tapered inwardly towards the ridge before being curved at 30 around and into the ridge 28 at the rear end 27. While shown curved at 30, it will be apparent that the curved configuration could as well be sharply formed. The wings are sized to extend beyond the beveled edges of the wall board making up a joint with which the tool is used.

Mud dams 31 and 32 are formed on and project at essentially right angles from the faces 23 and 24, respectively. The mud dams 31 and 32 each extend from their respective face to an outer surface that is aligned with an outermost surface of the ridge 28 and intermediate the projection of flange 25. Thus, the dams 31 and 32 will direct mud from a wall joint outwardly from the ridge 28 and rearwardly of the tool to be smoothed by passage of the dam thereover while allowing excess mud to flow across the dam to where it will be collected by the trailing portions of flange 25.

Shown in FIG. 3, the leading edge 35 of the ridge 28 is made sharp or curved rearwardly from a foremost edge 36 so that the ridge will cut through mud in a wall joint as the tool is moved in the groove at that wall joint.

The leading edges 37 and 38 of the flange 25 are curved away from the wings 13 and 14 to reduce frictional engagement with the wall board during use of the tool.

The tool 10 is used to smooth the mud applied to corner junction formed by beveled edges of sheetrock or wall board panels. The mud is applied to one surface of a tape and that surface is pressed into the corner joint. The tool of the invention, with a handle, not shown, screwed into handle attachment 12, is forced into the joint and then is pulled or pushed, using the handle, to travel the length of the joint. The direction of travel is with edge 26 leading and end 27 trailing. During travel, the leading edge 36 of ridge 28 slices through mud on the joint while mud dams 31 and 32 act on the tape to pull it forward (in the direction of travel) and outward so that the tape is not pressed deep into the corner. As previously noted, excess mud, not smoothed by the dams 31 and 32 passes over the dams and is carried within the space behind the dams 31 and 32, ridge 28 and flange 25.

Because the outermost edge 38 of the flange 25 is flat and has a sharp inner edge that contacts the wall board during travel of the tool mud cannot escape past the flange to form ridges on the wall board that would then have to be scraped or sanded before painting of the wall.

Although a preferred form of my invention has been herein disclosed, it is to be understood that the present disclosure is by way of example and that variations are possible without departing from the subject matter coming within the scope of the following claims and a reasonable equivalency thereof, which subject matter I regard as my invention.

I claim:

1. A corner finishing tool comprising a head including a pair of interconnecting wings extending from a junction at a selected angle from one another; a socket for a ball formed in the junction of the wings at rear faces of the wings; a ridge projecting from the intersection of the wings at face surfaces of the wings and having a leading edge and a rear end; a flange arranged around the outermost peripheral edges of the wings and connecting to a rear end of the ridge; and a mud dam projecting from a front face of each wing to the outermost surface of said ridge and extending rearwardly and outwardly of said ridge into engagement with said wing flange, with the outermost edge of said flange projecting from each wing face surface beyond the outermost edge of each said dam.

2. A corner finishing tool as in claim 1, wherein the tool is made of a plastic material.

3. A corner finishing tool as in claim 2, wherein the wings extend from a common junction outwardly further at a leading edge than at a rear of the tool.

4. A corner finishing tool as in claim 1, wherein the interconnecting wings extend from the junction at an angle of 92 to 95 degrees.

5. A corner finishing tool as in claim 1, wherein the ridge is curved equally on either side of a center peak; and the mud dams junction at the ridge intersect the said ridge curve.

* * * * *